United States Patent
Menkhoff

[19]

[11] Patent Number: 5,929,683
[45] Date of Patent: Jul. 27, 1999

[54] CLOCK GENERATOR FOR GENERATING A SYSTEM CLOCK CAUSING LITTLE ELECTROMAGNETIC INTERFERENCE

[75] Inventor: Andreas Menkhoff, Munich, Germany

[73] Assignee: Micronas Semiconductor Holding AG, Zurich, Switzerland

[21] Appl. No.: 08/922,348

[22] Filed: Sep. 3, 1997

[30] Foreign Application Priority Data

Sep. 4, 1996 [EP] European Pat. Off. ............. 96114131

[51] Int. Cl.$^6$ .................................................. H03K 1/04
[52] U.S. Cl. ......................... 327/292; 327/294; 327/299
[58] Field of Search ............................ 327/291, 292, 327/293, 294, 299

[56] References Cited

U.S. PATENT DOCUMENTS

| | | | |
|---|---|---|---|
| 4,023,116 | 5/1977 | Alfke et al. | 331/17 |
| 4,933,890 | 6/1990 | Nuytkens et al. | 364/721 |
| 5,426,392 | 6/1995 | Kornfeld | 327/551 |
| 5,699,005 | 12/1997 | Menkhoff et al. | 327/292 |

FOREIGN PATENT DOCUMENTS

| | | |
|---|---|---|
| 0715408 | 5/1996 | European Pat. Off. . |
| 4142563 | 6/1993 | Germany . |

*Primary Examiner*—Margaret R. Wambach
*Attorney, Agent, or Firm*—Arthur L. Plevy

[57] ABSTRACT

A clock generator serves to generate a stable frequency system clock for a clock-controlled electronic device. To ensure that the system clock causes only little electromagnetic interference to nearby electronic equipment, the system clock is modulated with respect to a reference clock by means of a phase modulator controlled by a random signal source which is noise colored by means of a weighting device.

20 Claims, 3 Drawing Sheets

| | | s40 | | | |
|---|---|---|---|---|---|
| | | 0 | 1 | 2 | 3 |
| s30 | a | 0 | 1 2 3 | 4 5 6 | 7 |
| | b | 0 1 2 | 3 | 4 | 5 6 7 |
| | c | 0 1 2 | 3 4 | 5 6 | 7 |
| | d | 0 4 5 | 1 2 | 3 6 | 7 |
| | e | 0 7 2 | 3 4 5 | 6 | 1 |
| | f | 0 1 | 2 3 | 4 5 | 6 7 |

CLOCK GENERATOR FOR GENERATING A SYSTEM CLOCK CAUSING LITTLE ELECTROMAGNETIC INTERFERENCE

CROSS-REFERENCE TO RELATED APPLICATIONS

The present application is related to commonly assigned patent application, application Ser. No. 08/563-173, now U.S. Pat. No. 5, 699,005 filed on Nov. 27, 1995, by Menkhoff, entitled "CLOCK GENERATOR FOR GENERATING A SYSTEM CLOCK CAUSING MINIMAL ELECTROMAGNETIC INTERFERENCE."

FIELD OF INVENTION

The present invention relates to a clock generator for generating a stable-frequency system clock for at least one clock-controlled electronic device, particularly in motor vehicles. The system clock itself and the resulting current spikes cause only little electromagnetic interference to nearby electronic equipment, since the system clock is modulated with respect to a reference clock by means of a phase modulator controlled by a random-signal source.

BACKGROUND OF THE INVENTION

The increasing use of digital, generally clock-controlled signal-processing devices in various fields of application, particularly in motor vehicles, for the display or control of diverse functions requires a centralized or decentralized clock system, to which the individual clock-controlled devices are connected. As a result, interference signals are produced, directly or via the connected supply or signal lines, in a wide frequency range. The interference signals may propagate to nearby electronic devices or equipment via electric or electromagnetic interference fields and an unshielded supply network, and interfere with the operation of such devices or equipment. This interference is particularly disturbing if it affects analog subcircuits or analog signals. In motor vehicles, the audio equipment (broadcast receiver, mobile-radio unit, cassette player) is particularly affected, but interference may also be caused to analog sensors. The cause of the interference are the steep-edge current surges or spikes in the clock-controlled devices, which are initiated by one or both pulse edges of the system clock. These current spikes are produced by the activation of a great number of switching stages, e.g., by the charging or discharging of gate capacitances in MOS circuits. The higher the clock frequency, the faster the internal switching operations must be. This is achieved by a low-impedance circuit design, but the lower the circuit impedances, the higher the resulting current spikes will become. The number of switching stages to be activated, and thus the height of the current spikes, increases with increasing circuit complexity, particularly if the associated clock-controlled devices, e.g., processors, are implemented in CMOS technology. Buffering the very narrow load current spikes by external blocking capacitors is possible only imperfectly on cost grounds and because of the usual package designs for integrated circuits. With such blocking capacitors it is hardly possible to suppress the radio-frequency components of the interference signals.

Some methods are known in the art whereby a clock system can be modified to reduce interference to adjacent electronic equipment. Measures designed to provide passive shielding or reduce of the edge steepness of unnecessarily steep current spikes do not form part of the invention but can advantageously be combined with the latter and provide further interference suppression. The present invention relates to a random modulation of the system clock which distributes the energy content of the interference signal as evenly as possible over as wide a frequency range as possible. On a time average, the clock frequency should not deviate from a reference clock of fixed frequency.

Prior art patent DE 41 42 563 A1 discloses a clock generator which modulates the system clock by means of a phase/frequency modulator. The modulator is an electronically controlled leakage-current path which modulates the VCO control voltage, the controlled leakage current having a sawtooth, triangular, sinusoidal or other waveform. Whether phase or frequency modulation is effected depends on the design of the phase-locked loop and on the maximum amplitude of the leakage current.

In prior art patent application DE-A-44 23 074, clock-induced interference effects are reduced by switching the output signal from a clock generator between at least two division ratios by means of a frequency divider to obtain a clock signal which is stable in frequency. The switching of the frequency divider is effected by a pseudorandom-number generator. Prior art patent application DE-A-44 23 074 was withdrawn prior to publication.

U.S. Pat. No. 4,023,116 discloses a frequency synthesis system whose output clock is locked to a reference clock via a phase-locked loop. As the phase comparison is only possible during the pulse edges of the reference clock, the time interval between the pulse edges acts on the phase/frequency control as a "dead band". During the dead-band interval, the frequency synthesis system is unregulated, so that small, unregulated variations may occur in the period of the output signal as unwanted phase differences. The dead band is eliminated by means of suitable circuitry, thus reducing the frequency jitter of the synthesized output signal.

U.S. Pat. No. 4,933,890 discloses a clock-generating system in which the edges of a clock signal provided by a digitally controlled oscillator (=NVO) are phase-modulated by means of a binary random-number source, which assumes two output states in a random sequence, in order to reduce the harmonic content of the resulting clock signal.

Prior art patent EP 0 715 408 A1 discloses a clock-generating system in which the respective clock-pulse edges are modified in phase by means of an analog or discrete random-signal source and a variable delay device. The output of the random-signal source is either an analog random signal or a plurality of discrete random values, particularly a digital pseudorandom-number sequence.

The prior-art clock generators use methods in which the principal spectral lines of the noise spectrum are reduced by distributing their energy content among further spectral lines. Those methods in which the number of additional spectral lines is as high as possible with the deterministic interrelationship being as small as possible are particularly effective. Especially suited are those methods which employ random-signal sources. For the frequency or phase modulation of the clock signal by means of a random-signal source—it is particularly advantageous to phase-modulate the leading and trailing edges independently of each other, the magnitude of the phase deviation is important. The greater the noise bandwidth used for the phase modulation or the greater the number of different random numbers, the larger the phase deviation and the additional number of spectral lines can become. Thus, the amplitudes of the resulting noise spectrum are reduced as desired. In practice, however, a limitation is imposed since the random phase modulation of the system clock also changes the available pulse duration, pulse spacing, or mark/space ratio. At high clock frequencies, the mark and/or space interval may occasionally fall below the value predetermined by the respective circuit design and technology, in which case proper functioning of the circuit is no longer ensured.

It is therefore an object of the invention to improve a clock generator with random phase modulation of the system clock in such a way that it provides a system clock causing little electromagnetic interference, said system clock being distributed among as many spectral lines as possible without degrading the performance of the clock-controlled circuit by excessive phase deviation. According to the invention, this object is attained by a clock generator with the features claimed in claim 1. Further advantageous features are defined in the subclaims.

SUMMARY OF THE INVENTION

A clock generator for generating a stable-frequency system clock for clock-controlled electronic devices, wherein said system clock causes only little electromagnetic interference to nearby electronic equipment, particularly in motor vehicles.

The system clock is modulated, particularly via its leading edge and/or trailing edge, with respect to a stable-phase and stable-frequency reference clock by means of a random-signal source and a phase modulator. The maximum phase deviation is limited to a value less than half the value of one period of the reference clock; and the reference-signal source provides either an analog output signal, whereby the statistical distribution of the resulting phase differences is continuous, or a discrete, particularly a digital input signal whose resolution is set so finely via the size of the quantization steps that the resulting phase differences have a fine structure smaller than one tenth of the period of the reference clock.

DETAILED DESCRIPTION OF THE INVENTION

Figure 1:
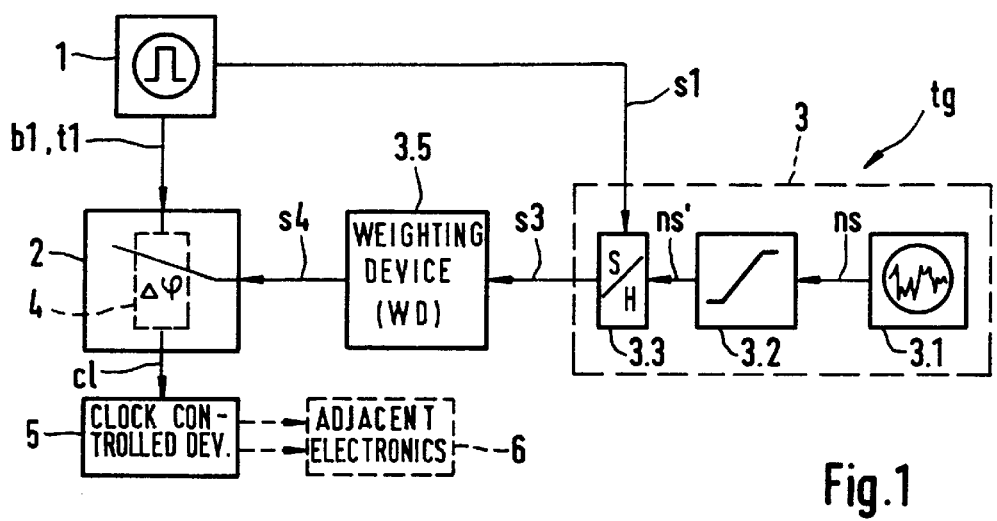
FIG. 1 is a block diagram of a clock generator according to the invention.
Figure 3:
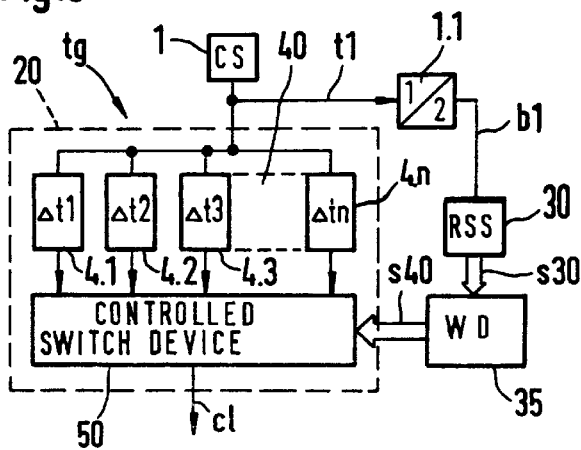
FIG. 3 shows a block diagram of a clock generator with a digitally controlled delay network as a phase modulator.
Figure 4:
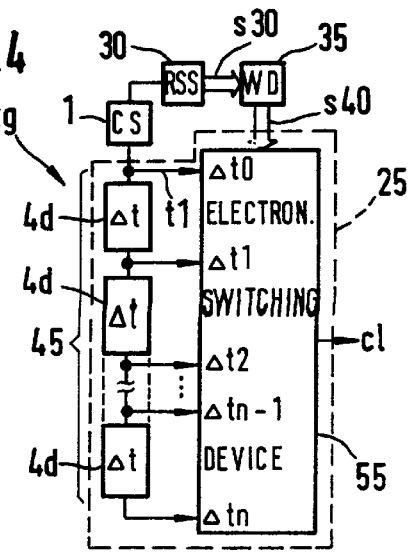
FIG. 4 shows a block diagram of a clock generator with a digitally controlled delay network as a phase modulator.

The clock generator of FIG. 1 contains all the circuit elements required to implement the invention. By analyzing the signal spectra of the current spike sequences i1, i5*, i5 of FIG. 2 in terms of their Fourier components, the following dependancies are obtained for the resulting spectra. For simplicity it is assumed that the individual current spikes i1, i5*, i5 are so narrow that their noise spectra extend into a frequency range which is greater than the frequency of the associated reference clock b1 by at least a factor of 10. As is well known, the spectrum of a fixed-frequency and fixed-phase sequence of narrow pulses which corresponds approximately to the sequence of current spikes i1 contains the harmonics of the reference clock b1, with the individual amplitudes decreasing only slightly with frequency (see FIG. 5). The spectral characteristics of phase-modulated pulse sequences corresponding approximately to the resulting current spike sequences i5* and i5 (see, for example, FIG. 6) are different—they are influenced by the following circuit properties, which are predeterminable by the clock generators of FIG. 1, FIG. 3, or FIG. 4:

1. The least common multiple of the inverse delays of all existing delays $\Delta t$ determines at what frequency the entire spectrum recurs. If there is no such common multiple, this corresponds to the ideal case in which the spectrum does not recur at all. This case is approximately attainable only with a random-signal source 3.1 whose output signal ns is an analog, aperiodic noise signal which controls a phase modulator 2 with infinitely fine time resolution. For practical applications, however, it is sufficient if the spectrum recurs, or is mirrored, only from a sufficiently high frequency f. The inverse value I/f of this frequency provides a time interval $\Delta t=1/f$ which represents the associated smallest quantization step for all phase shifts. This time interval $\Delta t$ is especially easy to implement with a switched delay device 40 or 45, e.g., a delay network as shown in FIG. 3 or FIG. 4. If $\Delta t$ is in the range of a few nanoseconds, the spectrum will theoretically recur after several hundred megahertz. As a rule, however, the edges of the current spikes are not steep enough for this, so that the noise spectrum is no longer present at these frequencies. After normalization to the reference period T, the time interval $\Delta t$ corresponds to the respective phase difference $\Delta\phi$.

2. The ratio of the longest delay Tg/2 to the period T of the reference clock b1 determines how much the harmonics in the spectrum are attenuated until they no longer stand out from the uniform noise as discrete spectral lines; thus, they are no longer identifiable.

3. The length of the sequence of random numbers without recurrence determines how closely the individual spectral lines are spaced. If the sequence of random numbers has a defined recurrence rate, which is generally the case with digital random-signal generators, it is a pseudorandom-number sequence. Since, on the other hand, the time duration Tn of the pseudorandom-number recurrence can be arbitrarily preset via the implementation of the digital random-number generator, the density of the spectral lines is also arbitrarily presettable. As mentioned at the beginning, the number of spectral lines to which the noise energy can distribute itself depends on how many spectral lines are present. A usable density of the spectral lines begins approximately with a structure finer than one tenth of the reference-clock period T.

4. By weighting the delays $\Delta t$, which are dependent on the respective noise signal ns, s3, s30, in a predetermined manner, the envelope of the reference-clock harmonics of the remaining noise spectrum can be influenced, so that in particular frequency ranges the interfering effect of the system clock can be further reduced. The penalty is a boost of the noise spectrum in other frequency ranges, which are not disturbing, however.

The following example is to illustrate this. A clock generator provides a 5-MHZ square-wave signal. In the clock-controlled devices, the positive- and negative-going pulse edges each cause a current spike, so that the current spikes occur at a frequency of 10 MHZ. The phase shift is produced by a delay chain consisting of delay stages which each delay the square-wave clock signal by 2 ns. A suitable random-number generator generates a sequence of random numbers with 256 values which recur periodically with a period of Tn=256T. The random-number sequence may be read from a table or may be generated by means of a pseudorandom-number generator. The example results in a density of the spectral lines with a spacing of about 40 kHz. If the random-number sequence were 10 times as long, the individual spectral lines would only be spaced approximately 4 kHz apart.

These considerations lead to the essential subcircuits of the clock generators tg shown in FIGS. 1, 3, and 4. Each clock generator includes a clock source (CS) 1 for generating a basic clock t1 which defines a reference clock b1 via the sequence of associated signal edges. In each clock generator tg, the basic clock t1 is modulated by means of a respective phase modulator 2, 20, 25 to generate a desired system clock cl, the phase modulator being controlled by a respective random-signal source (RSS) 3.1, 30. To sufficiently reduce the amplitudes of the interfering harmonics of the system clock cl in a predetermined frequency range (cf. the frequency range fb in FIG. 6), the output signal of the random-signal source (RSS) 3.1, 30 is subjected to noise coloring. This noise coloring is achieved by means of a weighting device (WD) 3.5, 35 which is coupled to the output of the random-signal source or is formed by the control characteristic of the phase modulator. Through these inventive measures, the clock-controlled electronic device 5 can no longer interfere with the operation of adjacent electronic equipment 6 via its resulting current spikes i5.

The phase modulator 2 of FIG. 1 includes a variable delay device 4 which delays the basic clock t1 by different time intervals depending on the value of a control signal s4, which was previously modified by means of an analog weighting device 3.5. The variable delay device 4 may be, for example, an analog delay chain consisting of series-connected inverters whose delay is dependent on the control signal s4. To prevent any change in the control signal s4 during the reference-clock period T, the control signal is held by a sample-and-hold circuit (S/H) 3.3. The control signal s1 for this circuit is either the basic clock t1 from the clock source (CS) 1 or a signal locked thereto. The random-signal source 3.1 in the signal source 3 provides at its output a noise signal ns, whose amplitudes are limited by means of a limiter 3.2. The output of the latter is a filtered noise signal ns', which is applied to the input of the sample-and-hold circuit (S/H) 3.3. The output s3 of the sample-and-hold circuit (S/H) 3.3, an uncolored noise signal, is applied to the input of the analog weighting device 3.5, which modifies the noise signal s3 in accordance with its characteristic (see, for example, FIG. 7) to form the noise signal s4.

The limiter 3.2 is necessary if the random-signal source 3.1 is not itself limited in output amplitude, because an unlimited noise signal could cause excessive phase differences in the case of the system clock signal edges. From the second condition mentioned above it follows that the longest delay Tg/2 must have a given relationship to the period T of the reference clock b1, because this determines how much the harmonics of the reference clock b1 are attenuated. From this it follows that the maximum value Tg/2 of the phase difference must not exceed a given value of the period T of the reference clock b1. As a rule, this value lies between 2 and 20% of the period T, but should not exceed T/2. FIGS. 3 and 4 are circuit diagrams of variable delay devices 40 and 45, respectively, which consist of digitally controlled delay stages 4.1, 4.2, 4.3, . . . , 4.n and 4.d, respectively, providing equal or unequal, but fixed delays $\Delta t1, \Delta t2, \Delta t3, \ldots, \Delta tn$ and $\Delta t$, respectively. Each delay stage may be implemented with a separate delay chain. The limiter 3.2 may also cause the noise coloring via a corresponding characteristic.

Figure 2:
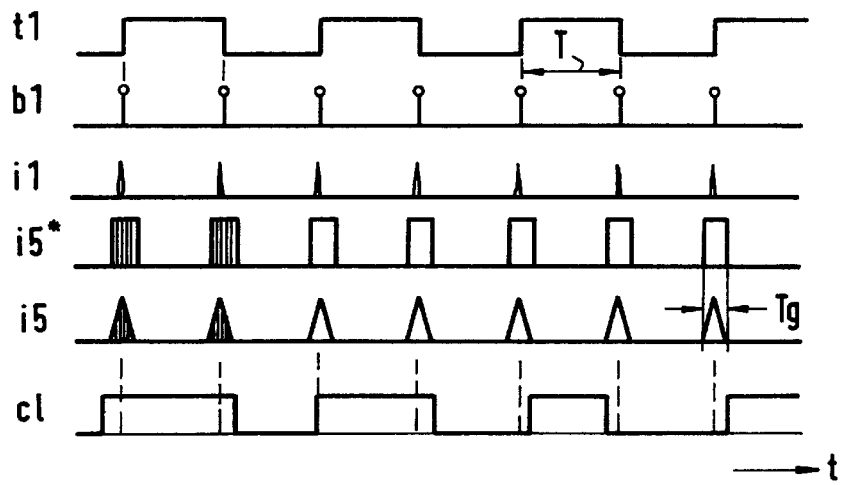
FIG. 2 illustrates schematically the time relationship between the clock-pulse edges and the resulting current spikes and between the basic clock, the reference clock, and the system clock over a few clock periods.

FIG. 2 shows schematically the shapes of a few signals for some periods T. The first line shows the square-wave basic clock t1 from the clock source (CS) 1. Without the phase modulation of the clock-pulse edges, a reference clock b1 of twice the frequency of the basic clock t1 would be obtained for the sequence of resulting current spikes i1. The phase modulation of the clock-pulse edges corresponds to a time window Tg in each reference-clock period T synchronously with the reference clock b1. Within the time window Tg, the current spikes i5* and i5 may occur at arbitrary or discrete instants. Half the value of the time window Tg corresponds to the maximum phase difference of the system clock cl with respect to the reference clock b1. The time duration of the current spikes is not changed by the phase modulation. In the presence of a uniform, i.e., nonweighted, random signal s3, s30, all phase states are present within the time window in the same form, cf. the rectangular envelope of the resulting current spikes in the fourth graph i5* of FIG. 2. According to the invention, the interference signals are further reduced in predetermined frequency ranges because the noise signals s4, s40, which are used for phase modulation, do not become effective uniformly, but are weighted. The weighting characteristic depends on the requirements placed on the frequency range which is to be less disturbed. As an example, the fifth graph i5 in FIG. 2 shows as the envelope of the current spikes a triangular curve shape in each time window Tg. The triangular shape is to represent the rate of occurrence of the current spikes i5 at the respective frequency; the height of the current spikes is constant, of course. The last graph cl in FIG. 2 shows a few periods T of the system clock cl, with the leading and trailing edges of the square-wave signal being modified in phase independently of each other with respect to the basic clock t1.

In FIG. 3, the phase modulator 20 produces quantized phase differences $\Delta t1, \Delta t2, \Delta t3, \ldots, \Delta tn$ whose fine structure is dependent on the smallest quantization step of the possible phase differences. The phase modulator 20 thus operates "digitally", for it can only produce a given number of phase differences which differ by the respective number of phase-difference steps $\Delta t$. The phase-difference step $\Delta t$ may be formed, for example, by the propagation delay through a single inverter stage or, to avoid signal inversion, through a double inverter stage which form part of a delay chain consisting of series-connected inverter stages. As is well known, the propagation delay through such inverter stages can be set within a wide range via the shunt current; manufacturing-process-induced or temperature-induced delay deviations can be compensated for by means of a control circuit. The respective delay is selected by means of a digitally controlled switching device 50 whose signal inputs are each connected to a respective one of the delay stages 4.1, 4.2, 4.3, . . . , 4.n. In response to a digital control signal s40 from a digital weighting device (WD) 35 coupled to the output of a digital random-signal source (RSS) 30, a respective one of the inputs of the switching device 50 is switched through to the output, which provides the system clock cl. The digital input s30 to the weighting device (WD) 35 is formed by digital random-number values from the random-signal source (RSS) 30. The random-number values are, as a rule, a pseudorandom-number sequence from a pseudorandom-number generator as is described, for example, in the above-mentioned DE-A-44 23 074 or EP-A-0 715 408. It is also possible, however, to store the pseudorandom-number sequence as a table which is read by the random-number generator (RSS) 30. The recurrence rate of the pseudorandom-number sequence is arbitrarily predeterminable by the length of the table or by the number of shift-register stages in the pseudorandom-number generator. In FIG. 3, the random-number generator (RSS) 30 is controlled by the reference clock b1, which is obtained by doubling the basic clock rate ti by means of a clock-rate-doubling circuit 1.1.

Figure 8:
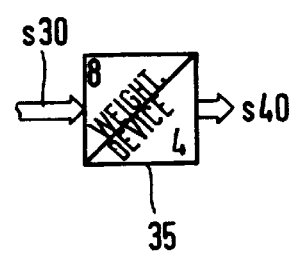
FIG. 8 shows examples of digital weighting in tabular form.

The digital weighting device (WD) 35 is designed, for example, as a logic allocator, which assigns a numerical output value to a numerical input value. Different, nonadjacent input numbers may also be combined into a single output number. FIG. 8 gives, in tabular form, some examples of how eight input numbers s30, for example, can be combined into four output numbers s40. Such tables can be readily implemented electronically in memories, with the number range of the input and output values s30, s40 of the weighting device in the implementation of the clock generator according to the invention being considerably greater than that in the example of FIG. 8. Via the arbitrarily predeterminable weighting of the originally uniform noise signals s30, the digital implementation of the weighting device (WD) 35 permits completely different noise colorations than the analog weighting device 3.5, which has a continuous control characteristic. The weighting in the weighting device (WD) 35 may, of course, also be effected by changing each input value via a table or a multiplying device. Combinations of multiplication and value combination are also possible. The value combination then corresponds to a multiplication, with the weighting factor being determined approximately by the ratio of the respective numbers combined. If, for example, the single values "5", "6", and "7" of n input values s30 are combined into a single output value "4" of m output values s40, this corresponds approximately to a weighting by a factor of 3 if n is approximately equal to m. A uniform compression of an equally weighted sequence of random numbers provides an equally weighted random-number sequence whose range is reduced, however. An example in which the number range is reduced without a change in weighting is shown in line f) of the table of FIG. 8.

FIG. 4 shows a clock generator tg according to the invention whose delay network 45 is especially easy to implement. The delay network consists of a predetermined number of series-connected delay stages 4d, which preferably provide equal delays Δt. A respective tap between every two delay stages is connected to an associated input of an electronic switching device 55. The beginning and the end of the delay chain are also connected to inputs of the switching device 55. Each delay stage 4d contains an even number of series-connected inverters, particularly two, the even number serving to prevent an inversion of the clock signal. The design of the delay device as an inverter chain is particularly advantageous for the circuit layout on the semiconductor chip since the delay stages 4d are equal-area circuit structures which can be conveniently combined in one unit. The individual transistors of the switching device 55 may be connected to the taps of the delay chain by short signal lines. A relatively compact arrangement of the delay devices 4, 40, 45 on the semiconductor surface is important to ensure that the time resolution of the system clock cl is dependent only on the respective tap and not on pulse edges of coupled-in interference signals. The smallest quantization steps, and thus the fine structure of the phase differences Δt and Δϕ, must be very small compared with the period T of the reference clock b1. To attain the object of the invention, it is further necessary that the phase shift follows only the random number, not an interference signal, which would then appear in the noise spectrum as an emphasized signal. By omitting some taps or by different resistance values 4d, weighted delays can be formed in a simple manner. This eliminates the need for the weighting device (WD) 35 between the random-number generator (RSS) 30 and the switching device 55. Similar weighting is possible with the resistor network 40 of FIG. 3 if the stepping of the individual resistances 4.n is effected not linearly, but in the desired form of weighting.

Figure 5:
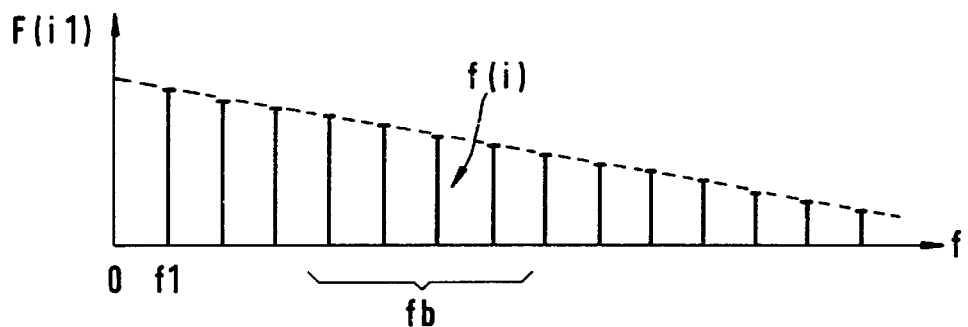
FIG. 5 shows schematically some spectral distributions of the interference signal.

FIG. 5 shows schematically the spectrum F(i1) of the fixed-frequency and fixed-phase current spikes i1. It contains discrete spectral lines which begin with the frequency f1 of the reference clock b1 and extend over a plurality of frequency multiples of f1. The amplitudes of the spectral lines decrease with increasing frequency. According to Fourier, this depends on the mark/space ratio and the steepness of the current spikes i1. This dependence is indicated schematically as an arrow f(I), which influences the decrement. In an assumed frequency range fb the amplitudes of the spectral components are still relatively large, so that the operation of other electronic equipment which could pick up interference signals in this frequency range would be affected in an undue manner.

Figure 6:
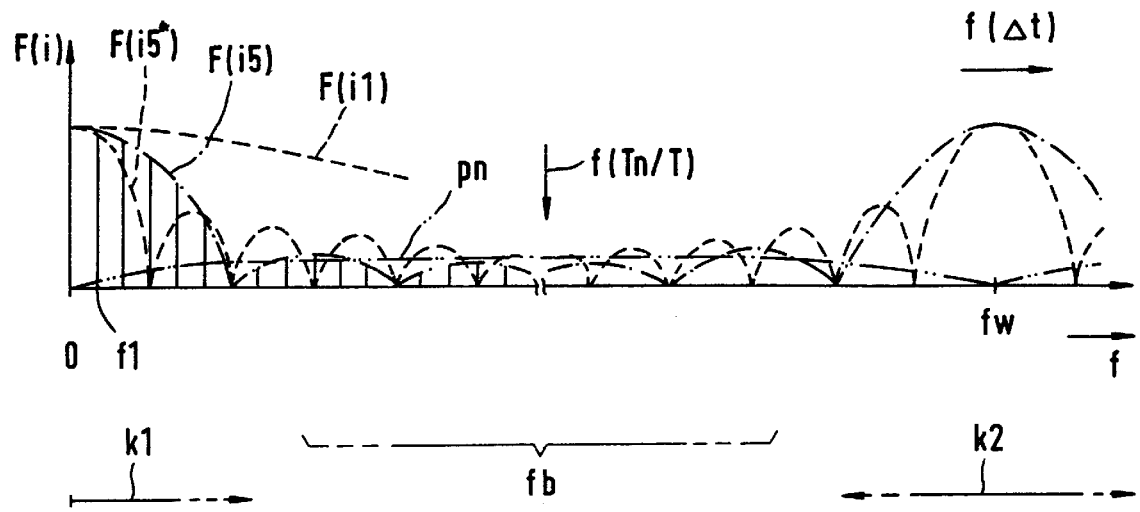
FIG. 6 shows schematically some spectral distributions of the interference signal.

FIG. 6 shows schematically the noise spectra F(I) of the resulting current spikes i1, i5*, i5 of the above-described clock-pulse sequences to illustrate the effect of the invention. The spectra shown, strictly speaking, are only the envelopes of the integral frequency multiples n×f1 of the reference clock b1. The amplitudes of these harmonics partly stand out considerably from the general noise background and are then disturbing. For the sake of clarity, FIG. 6 shows only a few interfering amplitudes at the frequency multiples n×f1. The envelopes of the following spectra are shown:

F(i1) shows the spectrum of the current spikes i1 of a system clock cl without phase modulation;

F(i5*) shows the spectrum of the current spikes i5* of a system clock cl with random-signal-controlled phase modulation; and F(i5) shows the spectrum of the current spikes i5 of a system clock cl with random-signal-controlled phase modulation and with weighted random signals.

In the frequency range k1 it can be seen that the reduction of the amplitudes of F(i5) and F(i5*) is considerably greater than the reduction of the amplitudes of F(i1). In the example of FIG. 6, for low frequency multiples n×f1 of the reference clock b1, the amplitude reduction without weighting is greater than that with weighting—this may be different for a different weighting. At the third harmonic, F(i5*) has a zero; the amplitudes of F(i5) have also become smaller there, but their value is by no means negligible. Only at the sixth harmonic 6×f1 of the reference clock b1 does F(i5) have a first zero; there, however, the spectrum F(i5*) has already its second zero. In the overlying frequency range fb, the amplitudes of F(i5) are nearly always below the amplitudes of the spectrum F(i5*) or are lost in the general noise pn. The selection of the zeros of F(i5) follows from the respective weighting functions of the noise signals s4, s40, and is therefore presettable. In the example of FIG. 6, the weighting function in the case of F(i5) is triangular (cf. the triangular envelope of the pulse sequence i5 in FIG. 2), while in the case of F(i5*) the weighting is uniform (cf. the rectangular envelope of the pulse sequence i5* in FIG. 2. Through the presetting of the triangular weighting, in FIG. 6, all even-numbered zeros of the spectrum F(i5*) coincide with the zeros of the spectrum F(i5). In the case of the spectrum F(i5), the interference-free frequency range fb, in which the amplitudes are lost in the general noise pn, is substantially greater than in the case of the spectrum F(i5*) or even F(i1).

In the frequency range k2, the spectrum of the frequency range k1 recurs at the frequency fw, this spectrum extending symmetrically toward higher and lower frequencies. The position of this frequency fw, as discussed in item 1 above, depends on the least common multiple of the inverse delays, i.e., on the smallest delay step Δt. This frequency fw, and hence the entire frequency range k2, should be so high that the critical frequency range fb is no longer affected. According to items 2 and 4 of the above dependencies, the attenuation of the harmonics in the frequency ranges k1, k2, and fb depends on the ratio of the longest delay Tg/2 to the period T of the reference clock b1 and on the selected weighting function with which the random signals s3, s30 are modified.

By the random-signal-controlled phase modulation, the entire energy of the noise spectrum is distributed among a plurality of frequencies. According to the invention, the distribution is additionally controlled by the above-described weighting in such a way that in the desired frequency range fb the remaining harmonics of the system clock are further reduced in amplitude at the expense of other frequency ranges k1, k2. The harmonics of the signal components, which are correlated with the plurality of different clock phases, contribute to the constantly present, approximately uniform noise level pn, whose envelope is indicated schematically in FIG. 6 as a dash-dot-dot line pn. The more closely the individual spectral lines are spaced, the smaller their respective contributions to the noise level pn, because the energy can distribute itself among more spectral components. The density of the spectral lines, according to item 3 above, is determined by the number of random numbers s40 in the time interval Tn in relation to the number of random numbers during the period T of the reference clock p1. The repetition rate of the pseudorandom-number sequence s40 thus determines the number of spectral lines in the frequency range from 0 to fw, and thus the density of the lines. The longer the predetermined sequence of pseudorandom numbers, the more spectral lines will be available, but the more complex the pseudorandom-number generator, the weighting device, and the phase modulator with the switching device will become.

By mathematical simulation, the above described parameters of the clock generator tg or the system clock cl can be easily varied and their influence on the signal spectrum F(i5) investigated. Thus, optimum parameters can be found which provide the desired interference suppression. The degree of similarity between the actual interference suppression effect and the simulation is very high. It should be pointed out that individual subcircuits of the clock generator tg can also be implemented with fast processors and corresponding programs.

Figure 7:
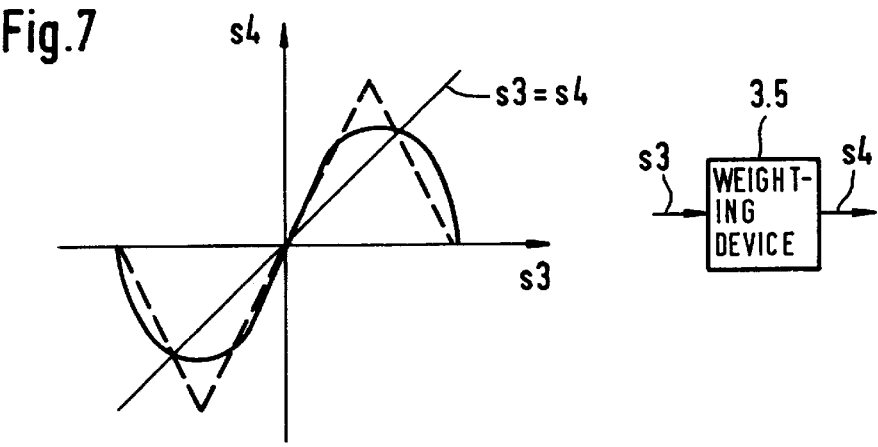
FIG. 7 show examples of analog weighting in a rectangular coordinate system.

FIG. 7 shows, by way of example, two different, centrosymmetric control characteristics of an analog weighting device 3.5 in rectangular coordinates s3, s4. One of the control characteristics is triangular, and the other sinusoidal. In both cases, central noise signals are amplified and the noise signals lying outside thereof are attenuated. The diagonal shows the weighting with s3=s4. Other control characteristics which exhibit mirror symmetry or are unsymmetrical are also possible.

FIG. 8 shows in tabular form a digital weighting device (WD) 35 which assigns a digital output signal s40 to a digital input signal s30. The input signal s30 comprises, for example, eight numerical values, and the output signal s40 four numerical values. Weighting is effected by assigning one to three numerical input values to one output value s40, the assignment being not limited to adjacent numerical values, cf. the examples in rows a) to e). The respective output value is not weighted if it can be reached from two input values; then, the weighting factor is 8/8. If the output value can be reached from three input values, the weighting factor is 12/8. If the output value can be reached from only one input value, attenuation is introduced, and the weighting factor is 4/8. The normalization is referred to the individual numerical value of the output signal s40. In case of normalization to the number range s40, each of the factors must be multiplied by 1/4. Since the numbers s30 are random numbers, it does not make any difference for the weighting which numbers are combined. For example, rows b) to e) produce the same weighting 12/8 for the number "0". Row f) shows an example of constant weighting.

Many other concepts and embodiments will be discerned by those skilled in the art when reviewing this application.

I claim:

1. A clock generator for generating a stable-frequency system clock for a clock-controlled electronic device, said system clock causing only little electromagnetic interference to nearby electronic equipment, particularly in motor vehicles, comprising:

a system clock which is modulated, particularly via, in a first modulation mode a leading edge with respect to a stable-phase and stable-frequency reference clock by means of a random-signal source and a phase modulator, in a second modulation mode a trailing edge with respect to said stable-phase and stable-frequency reference clock by means of said random-signal source and said phase modulator, and in a third modulation mode leading and trailing edges with respect to said stable-phase and stable-frequency reference clock by means of said random-signal source and said phase modulator;

a maximum phase deviation of said system clock limited to a value less than half the value of one period of the reference clock;

a random-signal source providing a random output signal wherein a first output mode said output signal is analog, wherein the statistical distribution of the resulting phase differences is continuous, and in a second output mode said output signal is discrete, particularly a digital output signal whose resolution is set so finely via the size of the quantization steps that the resulting phase differences have a fine structure smaller than one tenth of the period of the reference clock; and, a noise content of said output signal of the random-signal source is colored by means of a weighting device.

2. The clock generator of claim 1, wherein said random output signal in said second output mode comprises a periodic digital output signal, also referred to as a pseudorandom signal, with a period of a pseudorandom-number sequence corresponding to said pseudorandom signal being greater than ten times the value of the period of the reference clock.

3. The clock generator of claim 1, wherein the phase modulator comprises a variable delay device with a control input connected via the weighting device to an output of the random-signal source.

4. The clock generator of claim 3, wherein the phase modulator comprises a tapped delay network and a switching device connected to taps, the tapped delay network comprising delay stages providing delays respectively, and that a respective switch position of said switching device, and thus the instantaneous delay of the tapped delay network, is controlled by the weighted random-number values.

5. The clock generator of claim 4, wherein the weighting device is implemented by the delays of the tapped delay network.

6. The clock generator of claim 1, wherein the weighting device includes a limiter coupled to an output of the random-signal source.

7. A clock generator for generating a stable-frequency system clock for a clock-controlled electronic device, said system clock causing only little electromagnetic interference to nearby electronic equipment comprising:

a source clock for generating a basic clock signal having a predetermined frequency which defines a reference clock-signal having a period T;

a random signal source for generating a random modulating signal, said random modulating signal having signal components;

a weighting device, with an input coupled to said random signal source, for generating a biased random modulating signal by selectively biasing said signal components of said modulating signal, unevenly, respectively; and, a phase modulator, coupled to said source clock and said weighting device, and responsive to said biased random modulating signal, for generating said system clock, wherein said system clock is modulated with respect to said reference clock signal by a time period less than one-half of said period T.

8. The clock generator of claim 7, wherein:

said basic clock signal being phase stable and frequency stable;

said system clock is modulated by means of said biased random modulating signal and said phase modulator via, in a first modulation mode a leading edge with respect to said basic clock signal, in a second modulation mode a trailing edge with respect to said basic clock signal, and in a third modulation mode leading and trailing edges with respect to said basic clock signal; and, in a first output mode said modulating signal is analog, resulting in phase differences which are continuous, and in a second output mode said modulating signal is discrete signal with a signal resolution set sufficiently finely.

9. The clock generator of claim 8 wherein said biased random modulating signal, in said second output mode, comprises a digital signal whose resolution is set so finely via the size of the quantization steps, that the resulting phase differences have a fine structure smaller than one tenth of said period T.

10. The clock generator of claim 8, wherein said biased random modulating signal, in said second output mode, comprises a periodic digital pseudorandom signal with a period greater than ten times the value of said period T.

11. The clock generator of claim 7, wherein said phase modulator comprises a variable delay device with a control input coupled to said random signal source.

12. The clock generator of claim 11, wherein said phase modulator comprises a tapped delay network comprising:

delay stages, respectively providing delays, interspaced with taps; and, a switching device coupled to said taps, wherein, a respective switch position of said switching device, and thus the number of said delay stages contributing to the instantaneous delay of the tapped delay network, is controlled by said biased random modulating signal.

13. The clock generator of claim 11, wherein said weighting device is implemented by said variable delay device.

14. The clock generator of claim 12, wherein said weighting device is implemented by said delay stages of said tapped delay network.

15. The generator of claim 7, wherein said reference clock signal has a frequency twice that of said basic clock signal.

16. The clock generator of claim 15, wherein said random signal source comprises a random signal generator.

17. The clock generator of claim 16, wherein said random signal source further comprises a sample and hold circuit.

18. The clock generator of claim 16, wherein said weighting device comprises a limiter coupled to said random signal source.

19. A method for generating a stable frequency system clock for a clock-controlled electronic device, said method enabling said system clock to operate with reduced electromagnetic interference, comprising:

generating a basic clock signal having a predetermined frequency;

deriving a reference clock signal having a period T from said basic clock signal; and, applying a weighted random signal to said basic clock signal to produce a system clock having a delay, with respect to said reference clock signal, less than one-half of said period T, and according to said weighted random signal.

20. The method of claim 19, wherein:

said reference clock signal has a frequency twice that of the basic clock signal; and, said weighted random signal is generated by a weighted random signal generator comprising, in a first biasing mode a random analog delay circuit with a weighting device, and in a second biasing mode a digitally controlled delay circuit producing a quantized phase delay having a smallest quantization step which is less than one-tenth of a period of said reference clock with a weighting device.

* * * * *